July 1, 1958
K. W. JAY
2,841,419
FLEXIBLE INNER TO OUTER PIPE
COUPLING WITH PLURAL SEALS
Filed Nov. 7, 1955
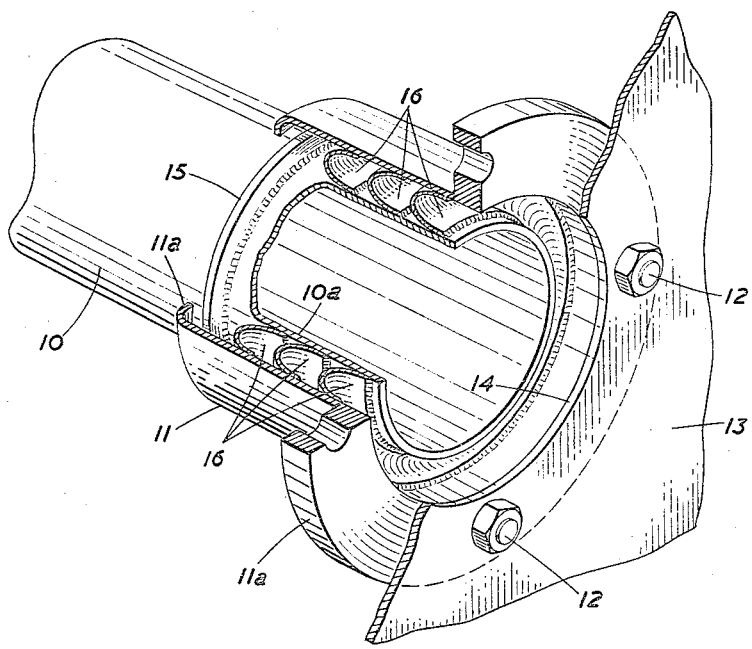
Inventor
KENNETH W. JAY
By: Maybee & Legris
Att'ys

United States Patent Office 2,841,419
Patented July 1, 1958

2,841,419

FLEXIBLE INNER TO OUTER PIPE COUPLING WITH PLURAL SEALS

Kenneth William Jay, Beverley Hills, Ontario, Canada, assignor to Orenda Engines Limited, Malton, Ontario, Canada, a corporation Application November 7, 1955, Serial No. 545,386

2 Claims. (Cl. 285—225)

This invention relates to flexible pipe couplings.

The object of the invention is to provide a pipe coupling that (a) is flexible axially and angularly, (b) can be made of metal without sacrificing flexibility, and (c) provides a positive seal.

A further object of the invention is to provide a coupling of this kind that has multiple safeguards against failure of the joint.

These objects are all attained by the embodiment of the invention disclosed in the following description and the accompanying drawing, which are of a coupling between a pipe and the wall of a vessel into which or out of which the pipe leads.

The drawing is a fragmentary perspective view of a coupling according to the invention, and showing the parts in section.

In the embodiment illustrated, the end section 10a of a pipe 10, the male part of the joint, extends within a sleeve-like adaptor 11 of substantially greater diameter, the adaptor being the female part of the joint. The adaptor has an annular fastening flange 11a secured by bolts 12 to the wall 13 of a vessel and surrounding an opening 14 in the wall. (The female part could equally well be the end of another section of pipe rather than being an adaptor attached to a vessel as shown.)

The male part 10a has a projecting stop on its outer surface in the form of a collar 15 encircling the pipe. The outer or remoter side of the collar is engaged by a co-operating stop on the end of the female part, formed by turning-in the end of the adaptor 11 to produce an inner flange 11b. This arrangement prevents the male and female parts from being drawn apart axially, but permits some relative axial movement and as much relative angular movement as the difference between the diameters of the male and female parts permits.

To seal the joints between the two parts and to constrain the relative movement between them, a plurality of annular diaphragms 16 of thin sheet metal or other resilient material are secured to both parts so as to span the space between them. The diaphragms are preferably of U-section U-shaped in radial section between the two parts of the joint, with the sides of the U secured to the two parts. This provides a dished annular surface that can be resiliently deflected and that will therefore permit some relative axial and angular movement between the parts of the joint.

The diaphragms are preferably furnace-brazed to the female part 10a and to the adaptor 11, to produce a positive seal, and the preferred number of diaphragms is three as shown.

The fluid pressure within the pipe system acts on the innermost diaphragm only, of course, but if it should fail, the next one will be available to resist the pressure, and so on.

The inter-engaging stops 15 and 11a restrain the relative movement of the parts so as to avoid overdeflection of the diaphragms.

The foregoing description sets forth the best mode contemplated by the inventor of carrying out his invention, but the following claims are intended to cover all useful changes and modifications of the said mode which are within the scope of the invention.

What I claim as my invention is:

1. A pipe coupling comprising a cylindrical pipe having an annular flange on its outer surface spaced from one end of the pipe, a cylindrical sleeve-like adaptor having an inner diameter greater than the outer diameter of the circumferential flange, the adaptor encircling the said pipe from the said end to beyond the said flange and having an inner annular flange located at the side of the said circumferential flange remote from the said end of the pipe, the inner diameter of the inner flange being less than the outer diameter of the said circumferential flange whereby the pipe is prevented from being withdrawn from the adaptor, and a plurality of annular resilient seals of thin sheet metal spaced apart lengthwise of said pipe and independently sealing the space between the adaptor and the pipe, the seals being U-shaped in axial section and facing in the same direction between the adaptor and the pipe, the sides of each of the U-sections being in engagement with and secured at their free ends to the outer and inner surfaces respectively of the pipe and the adaptor.

2. A pipe coupling as claimed in claim 1 in which the seals are secured to the outer and inner surfaces and the adaptor by furnace-brazing.

References Cited in the file of this patent

UNITED STATES PATENTS

| | | |
|---|---|---|
| 367,516 | Oubert | Aug. 2, 1887 |
| 858,100 | Pedersen | June 25, 1907 |
| 1,015,180 | Heitman | Jan. 16, 1912 |
| 1,117,840 | Hamilton | Nov. 17, 1914 |
| 1,754,426 | Hudgkinson | Apr. 15, 1930 |
| 1,883,278 | Zerk | Oct. 18, 1932 |
| 1,894,094 | Hackett | Jan. 10, 1933 |
| 1,923,124 | Stanley | Aug. 22, 1933 |
| 1,992,612 | Hall | Feb. 26, 1935 |
| 2,331,932 | Rowand | Oct. 19, 1943 |
| 2,468,924 | Courtier | May 3, 1949 |
| 2,702,987 | Nicolin | Mar. 1, 1955 |

FOREIGN PATENTS

| | | |
|---|---|---|
| 527,344 | Germany | Mar. 12, 1929 |
| 56,669 | Denmark | Aug. 28, 1939 |